United States Patent
Hwang et al.

(10) Patent No.: US 11,386,784 B2
(45) Date of Patent: Jul. 12, 2022

(54) SYSTEMS AND METHODS FOR VEHICLE POSE PREDICTION

(71) Applicant: GM GLOBAL TECHNOLOGY OPERATIONS LLC, Detroit, MI (US)

(72) Inventors: Joon Hwang, Pflugerville, TX (US); Mason D. Gemar, Cedar Park, TX (US); Geoffrey Wakefield, Lakeway, TX (US); Donal B. McErlean, County Clare (IE); Scott E. Jackson, Northville, MI (US); Jim McCord, County Clare (IE); Damien P. Rennick, County Claire (IE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/086,927

(22) Filed: Nov. 2, 2020

(65) Prior Publication Data
US 2022/0139223 A1    May 5, 2022

(51) Int. Cl.
| G08G 1/137 | (2006.01) |
| B60W 60/00 | (2020.01) |
| G08G 1/01 | (2006.01) |
| B60W 40/04 | (2006.01) |
| G05D 1/00 | (2006.01) |
| G05D 1/02 | (2020.01) |

(52) U.S. Cl.
CPC ............. *G08G 1/137* (2013.01); *B60W 40/04* (2013.01); *B60W 60/00276* (2020.02); *G05D 1/0011* (2013.01); *G05D 1/0268* (2013.01); *G08G 1/0112* (2013.01)

(58) Field of Classification Search
CPC ..... G08G 1/137; G08G 1/0112; B60W 40/04; B60W 60/00276; G05D 1/0011; G05D 1/0268
See application file for complete search history.

(56) References Cited

U.S. PATENT DOCUMENTS

| 11,036,238 B2* | 6/2021 | Nobukawa ........... G08G 1/0112 |
| 2018/0150086 A1* | 5/2018 | Nobukawa ........... G08G 1/0112 |
| 2020/0307563 A1* | 10/2020 | Ghafarianzadeh ......................... B60W 60/00276 |

(Continued)

OTHER PUBLICATIONS

Salomonson et al, Mixed Driver Intention Estimation and Path Prediction Using Vehicle Motion and Road Structure Information, 2015, Chalmers University of Technology, 68 pages (Year: 2015).*

*Primary Examiner* — Dale W Hilgendorf
(74) *Attorney, Agent, or Firm* — Lorenz & Kopf LLP (57) ABSTRACT

Systems and method are provided for predicting a vehicle pose. In one embodiment, a system includes a non-transitory computer readable medium. The non-transitory computer readable medium includes: an asynchronous prediction module configured to, by a processor, receive vehicle data from a vehicle, and compute a prediction of vehicle pose from the vehicle data, wherein the computation is performed asynchronously using a vehicle time frame and a common coordinate system; and a synchronous prediction module configured to, by the processor, compute a final prediction of the vehicle pose across the vehicle population based on the prediction of vehicle pose from the asynchronous prediction module, wherein the computation is performed synchronously using a global time frame and the common system.

20 Claims, 4 Drawing Sheets

(56) References Cited

U.S. PATENT DOCUMENTS

| | | | |
|---|---|---|---|
| 2020/0388163 A1* | 12/2020 | Zhang | G08G 1/0112 |
| 2021/0089040 A1* | 3/2021 | Ebrahimi Afrouzi | G05D 1/0248 |
| 2021/0352590 A1* | 11/2021 | Marsh | G01P 13/00 |

* cited by examiner

SYSTEMS AND METHODS FOR VEHICLE POSE PREDICTION

INTRODUCTION

The present disclosure generally relates to vehicles, and more particularly relates to systems and methods for estimating vehicle pose for vehicles associated with transportation systems.

Some transportation systems provide real-time guidance to vehicles in a given environment. In order to provide guidance in real-time, the transportation systems rely on position an inertial information about the vehicles in the environment. The transportation systems compute the information based on data received from the vehicles. In some instances, the vehicle data and/or system computations can be unreliable due to inaccurate sensor readings, variable system latency, network latency, data loss over the network, and/or model discrepancies.

Accordingly, it is desirable to provide improved systems and methods for predicting vehicle pose information. Furthermore, other desirable features and characteristics of the present invention will become apparent from the subsequent detailed description and the appended claims, taken in conjunction with the accompanying drawings and the foregoing technical field and background.

SUMMARY

Methods and system are provided for predicting a vehicle pose. In one embodiment, a system includes a non-transitory computer readable medium. The non-transitory computer readable medium includes: an asynchronous prediction module configured to, by a processor, receive vehicle data from a vehicle, and compute a prediction of vehicle pose from the vehicle data, wherein the computation is performed asynchronously using a vehicle time frame and a common coordinate system; and a synchronous prediction module configured to, by the processor, compute a final prediction of the vehicle pose across the vehicle population based on the prediction of vehicle pose from the asynchronous prediction module, wherein the computation is performed synchronously using a global time frame and the common coordinate system.

In various embodiments, the asynchronous prediction module computes the prediction of the vehicle pose based on a last estimation of vehicle pose, a current prediction of vehicle pose, and the vehicle data.

In various embodiments, the asynchronous prediction module computes the prediction of the vehicle pose based on a prediction model associated with at least one of a curved road and a straight road. In various embodiments, the prediction model is based on a Constant Turn Rate and Acceleration (CTRA) model. In various embodiments, the prediction model is based on a Constant Turn Rate and Acceleration (CTRA) model and a Constant Turn Rate and Velocity (CTRV) model.

In various embodiments, the asynchronous prediction module computes the prediction of the vehicle pose based on an error profile model. In various embodiments, the error profile model is associated with a vehicle type and a driving habit associated with the vehicle data.

In various embodiments, the synchronous prediction module computes the final prediction of the vehicle pose based on a prediction model associated with at least one of a curved road and a straight road. In various embodiments, the prediction model is based on a Constant Turn Rate and Acceleration (CTRA) model. In various embodiments, the prediction model is based on a Constant Turn Rate and Acceleration (CTRA) model and a Constant Turn Rate and Velocity (CTRV) model.

In various embodiments, the synchronous prediction module computes the final prediction of the vehicle pose based on an error profile model. In various embodiments, the error profile model is associated with a vehicle type and a driving habit associated with the vehicle data.

In another embodiment, a method for predicting a vehicle pose includes: receiving, by a processor, vehicle data from a vehicle; computing, by the processor, a first prediction of vehicle pose from the vehicle data, wherein the computation is performed asynchronously using a vehicle time frame and a common coordinate system; computing, by the processor, a final prediction of the vehicle pose based on the first prediction of vehicle pose, wherein the computation is performed synchronously using a global time frame and the common coordinate system; and performing, by the processor, remote control of a vehicle based on the final prediction.

In various embodiments, the computing the prediction of the vehicle pose is based on a last estimation of vehicle pose, a current prediction of vehicle pose, and the vehicle data.

In various embodiments, the computing the prediction of the vehicle pose is based on a prediction model associated with at least one of a curved road and a straight road. In various embodiments, the prediction model is based on a at least one of a Constant Turn Rate and Acceleration (CTRA) model and a Constant Turn Rate and Velocity (CTRV) model.

In various embodiments, the computing the prediction of the vehicle pose is based on an error profile model. In various embodiments, the error profile model is associated with a vehicle type and a driving habit associated with the vehicle data.

In various embodiments, the computing the final prediction of the vehicle pose is based on a prediction model associated with at least one of a curved road and a straight road. In various embodiments, the prediction model is based on at least one of a Constant Turn Rate and Acceleration (CTRA) model and a Constant Turn Rate and Velocity (CTRV) model.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
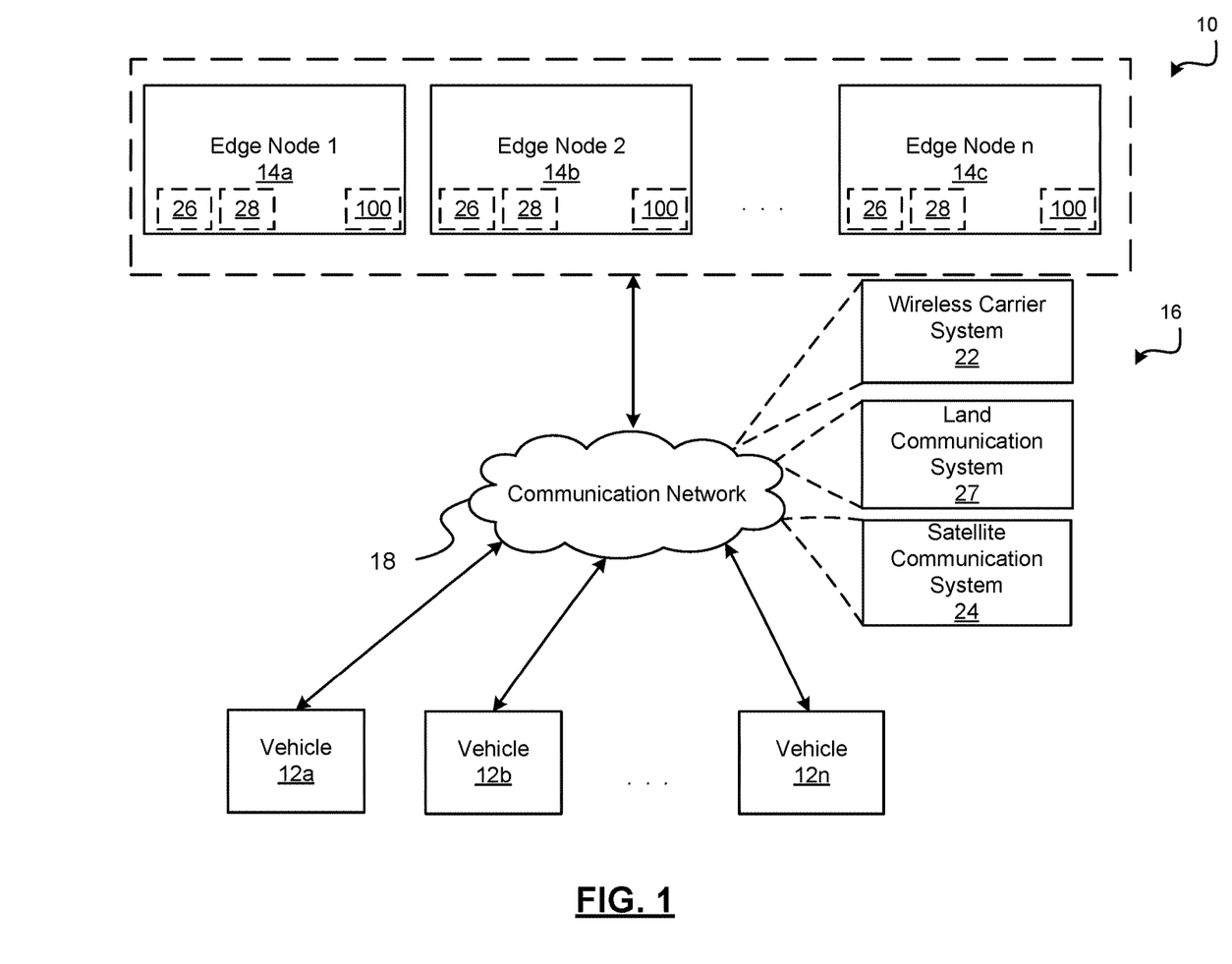
FIG. 1 is a functional block diagram illustrating a transportation system having vehicle pose prediction system and one or more vehicles in accordance with various embodiments.

With reference now to FIG. 1, a vehicle pose prediction system shown generally at 100 is associated with a remote transportation system 10 in accordance with various embodiments. In general, the vehicle pose prediction system 100 receives and processes sensor data from various vehicles 12a-12n and estimates position and inertial information, hereinafter referred to a vehicle pose, for use in remote control of the various vehicles 12a-12n, collision probability, sensor fusion, and/or other functions performed by the remote transportation system 10.

In various embodiments, the remote transportation system 10 includes one or more backend server systems, which may be cloud-based, network-based, or resident at the particular campus or geographical location serviced by the remote transportation system 10. The remote transportation system 10 can be manned by a live advisor, or an automated advisor, or a combination of both. In various embodiments, the remote transportation system 10 includes one or more edge nodes 14a-14n disposed at various locations about an operating environment 16 of the remote transportation system 10. The edge nodes 14a-14n are communicatively coupled, via a communication network 18, to the vehicles 12a-12n traveling in the operating environment 16.

The communication network 18 supports communication as needed between devices, systems, and components within the operating environment 16 (e.g., via tangible communication links and/or wireless communication links). For example, the communication network 18 can include a wireless carrier system 22 such as a cellular telephone system that includes a plurality of cell towers (not shown), one or more mobile switching centers (MSCs) (not shown), as well as any other networking components required to connect the wireless carrier system 22 with a land communications system. Each cell tower includes sending and receiving antennas wireless carrier system 22 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 22. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 22, a second wireless carrier system in the form of a satellite communication system 24 can be included to provide uni-directional or bi-directional communication with the vehicles 12a-12n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 12a-12n and the station. The satellite telephony can be utilized either in addition to or in lieu of the wireless carrier system 22.

A land communication system 27 may further be included that is a conventional land-based telecommunications network connected to one or more landline telephones and connects the wireless carrier system 22 to the remote transportation system 10. For example, the land communication system 27 may include a public switched telephone network (PSTN) such as that used to provide hardwired telephony, packet-switched data communications, and the Internet infrastructure. One or more segments of the land communication system 27 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 10 need not be connected via the land communication system 27 but can include wireless telephony equipment so that it can communicate directly with a wireless network, such as the wireless carrier system 22.

In various embodiments, each of the edge nodes 14a-14n include at least one processor 26 and a computer readable storage device or media 28. The processor 26 can be any custom made or commercially available processor, a central processing unit (CPU), a graphics processing unit (GPU), an auxiliary processor among several processors, a semiconductor based microprocessor (in the form of a microchip or chip set), a macroprocessor, any combination thereof, or generally any device for executing instructions. The computer readable storage device or media 28 may include volatile and nonvolatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the edge nodes 14*a*-14*n* in determining information related to the vehicles 12*a*-12*n* and controlling the vehicle 12*a*-12*n* based thereon.

In various embodiments, the instructions may include one or more separate programs, each of which comprises an ordered listing of executable instructions for implementing logical functions. The instructions, when executed by the processor 26, receive and process signals from the vehicles 12*a*-12*n*, perform logic, calculations, methods and/or algorithms for estimating information about the vehicles 12*a*-12*n* in the operating environment 16, and generate control signals to other edge nodes 14*a*-14*n* and/or the vehicles 12*a*-12*n* to assist in control of components of the vehicles 12*a*-12*n* based on the logic, calculations, methods, and/or algorithms. In various embodiments, the instructions include one or more parts of the vehicle pose prediction system 100 disclosed herein. As will be disclosed herein, in various embodiments, the vehicle pose prediction system 100 adjusts asynchronous estimations and predictions of the vehicle pose to compensate for incomplete or partial sensor data deficiencies due to data loss or sensor reliability. In various embodiments, the vehicle pose prediction system 100 provides for global synchronous predictions and updates of the vehicle data stream supplemented by batch processes which compensates for system lag and latency. In various embodiments, the vehicle pose prediction system 100 has learning capability that continuously tunes vehicle state prediction models so that accuracy improves with time. In various embodiments, the vehicle pose prediction system 100 allows error boundaries for sensor data to be projected into calculations for vehicle states at a global time.

As can be appreciated, the subject matter disclosed herein provides certain enhanced features and functionality to what may be considered as a standard or baseline based remote transportation system 10. To this end, a remote transportation system 10 can be modified, enhanced, or otherwise supplemented to provide the additional features described in more detail below.

Figure 2:
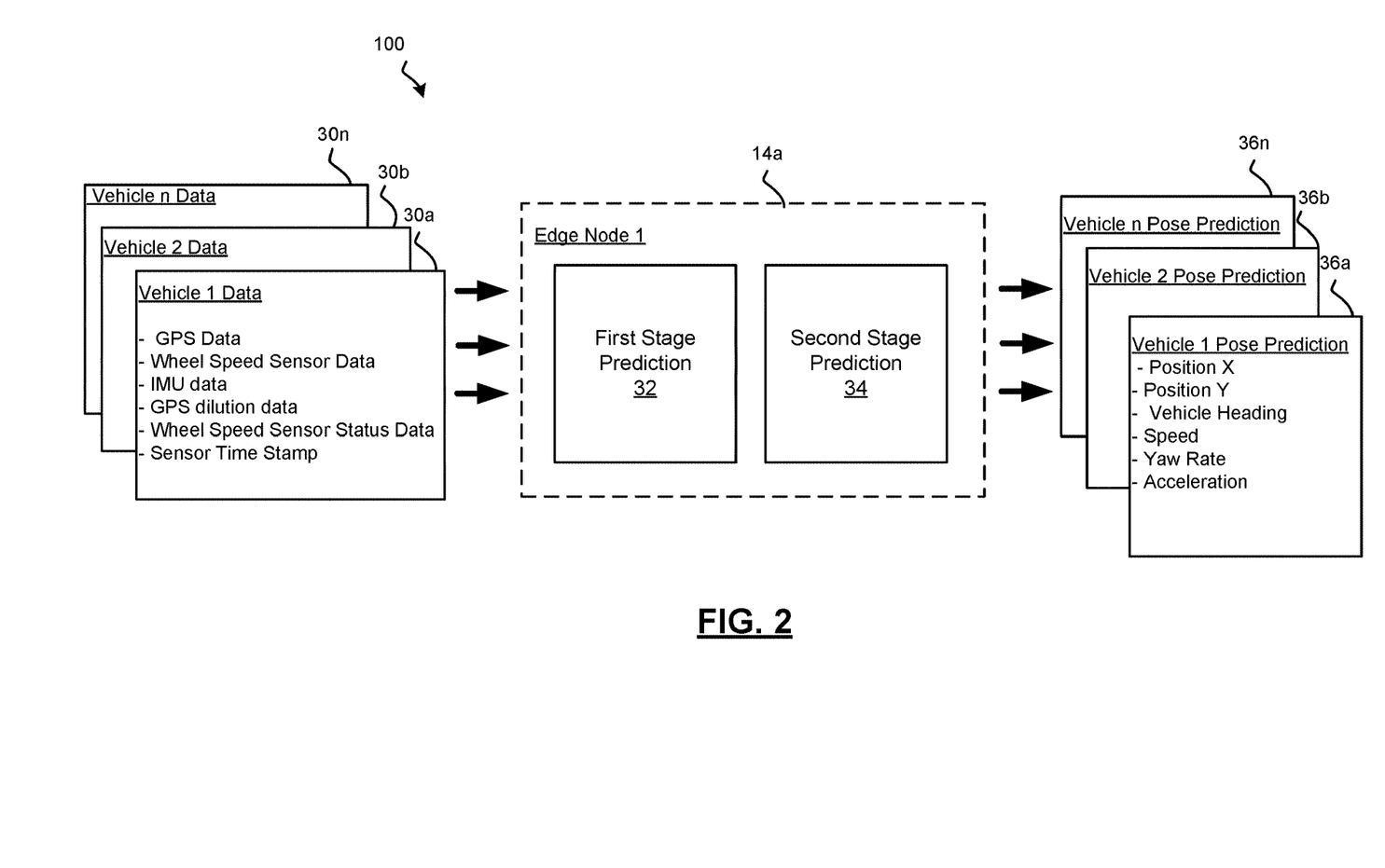
FIG. 2 is a functional block diagram illustrating the vehicle pose prediction system in accordance with various embodiments.

With reference now to FIG. 2, the vehicle pose prediction system 100 is described in more detail in the context of the exemplary operating environment 16 as described in FIG. 1. In various embodiments, each vehicle 12*a*-12*n* having communication capability with one or more edge nodes 14*a*-14*n* transmits a stream of vehicle data 30*a*-30*n* to at least one of the edge nodes 14*a*. Such vehicle data 30*a*-30*n* can include, but is not limited to, for each vehicle 12*a*-12*n* global positioning system (GPS) data, GPS dilution of precision data, wheel speed sensor data, wheel speed sensor status data, inertial measurement unit (IMU) data, and a sensor time stamp.

Each edge node 14*a* receives the streams of vehicle data 30*a*-30*n* from the group of loosely connected participating vehicles 12*a*-12*n* in the operating environment 16. Each edge node 14*a* groups the received vehicle data 30*a*-30*n* based on geographical proximity of the vehicles to reduce the projection distortion within a given edge node 14*a*. Thereafter, each edge node 14*a* recursively predicts and updates a vehicle pose for each vehicle 12*a*-12*n* in the group using a two-stage prediction system. In various embodiments, the two-stage prediction system includes a first stage 32 that computes estimations and predictions of vehicle pose asynchronously using the vehicle's own time frame and a common absolute space coordinate system; and a second stage 34 that computes final predictions of vehicle pose 36*a*-36*n* synchronously using the asynchronous estimations and predictions and a global time frame.

Figure 3:
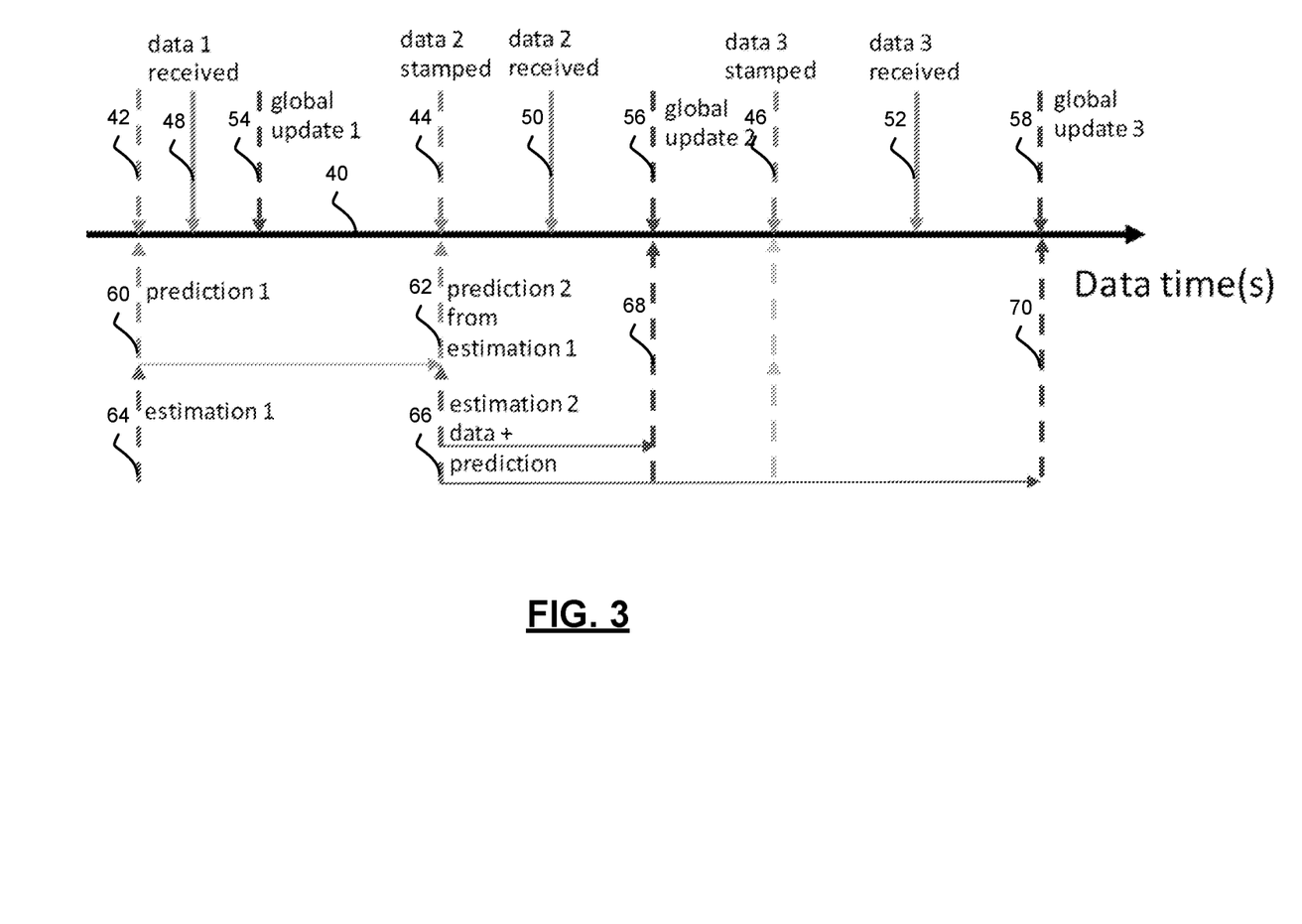
FIG. 3 is a timing chart illustrating timing of predictions and estimations of the vehicle pose prediction system in accordance with various embodiments.

For example, FIG. 3 illustrates a timeline 40 illustrating the asynchronous timing and the synchronous timing of the estimations and predictions performed by the vehicle pose prediction system 100. The top portion of the timeline illustrates the global time frame and the synchronous timing, and the bottom portion of the timeline illustrates a vehicle time frame and the asynchronous timing. As shown, data is time stamped at 42, 44, and 46. The time stamped data is then received at 48, 50, and 52. Global updates of the vehicle pose are provided at 54, 56, and 58. Estimations are computed at 64 and 66. Predictions are computed at 60 and 62 from the estimations 64 and 66.

In one example, as shown, when data 2 is received at 50, the system 100 computes the prediction and estimation with the fixed time interval based on the recorded time at 62 and 66. Once the estimation step is finished, the system 100 decides which global update 56 or 58 it should use the prediction and estimation. In various embodiments, the system 100 uses the time difference between the estimation time and the update target to compute the time-based global predictions 68 and 70.

As can be appreciated, FIG. 3 illustrates predictions and estimations for a single vehicle. In various embodiments, multiple estimations can be computed for up to 1000+ vehicles. In such embodiments, the system 100 decides which among of these estimations should be on either global update 56 or 58. If some of the estimations miss the nearest coming global update, the missed estimations are included in the next upcoming global update with added time and added uncertainty.

Figure 4:
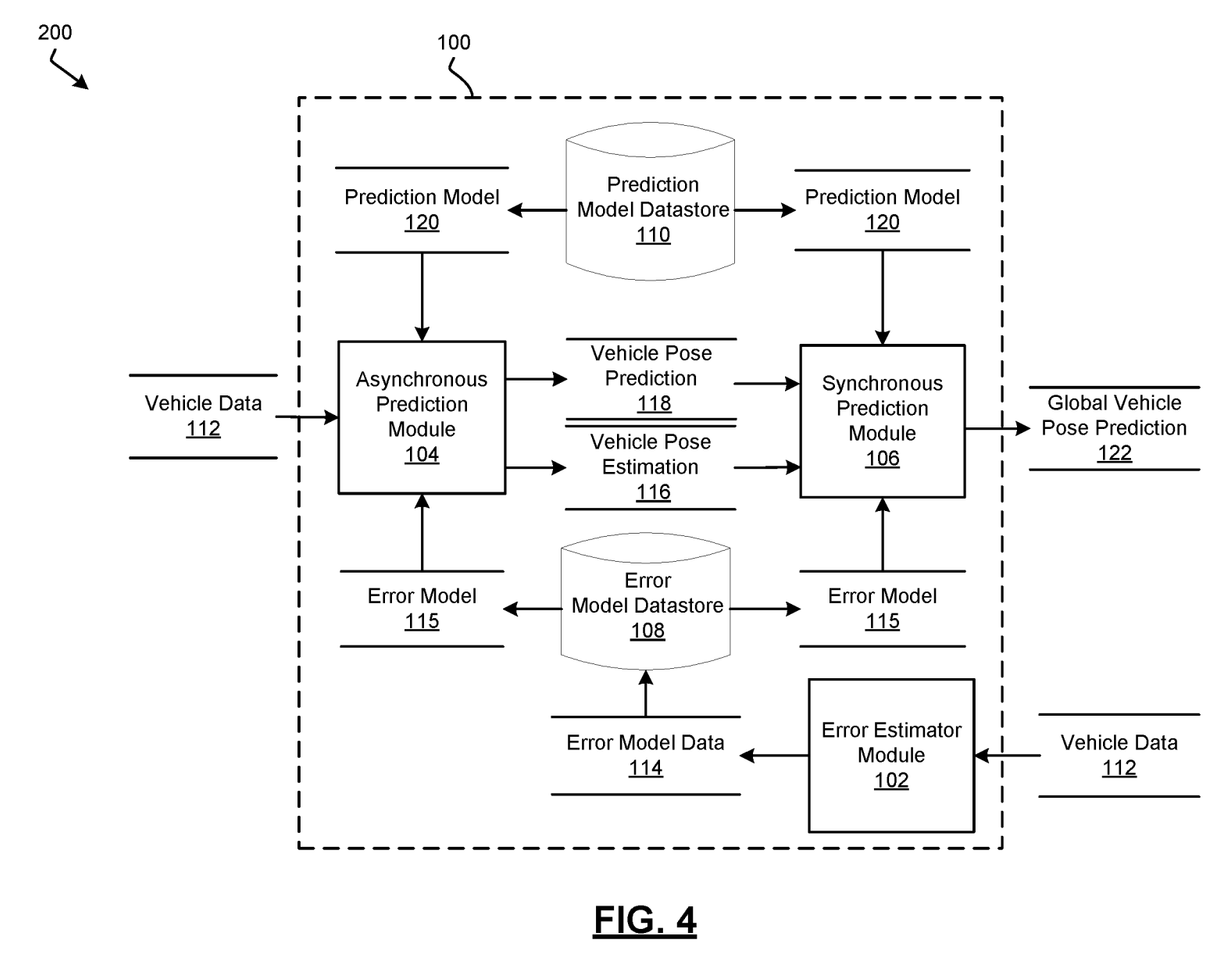
FIG. 4 is a dataflow diagram methods and system components of the vehicle pose system in accordance with various embodiments.

With reference now to FIG. 4, a dataflow diagram illustrates the vehicle pose prediction system 100 and a vehicle pose prediction method 200 in accordance with various embodiments. The vehicle pose prediction system 100 includes an error estimator module 102, an asynchronous prediction module 104, a synchronous prediction module 106, an error model datastore 108, and a prediction model datastore 110. Each of the modules 102-106 perform steps of the vehicle pose prediction method 200. As can be appreciated, the steps of the method 200 may be performed in varying order as applicable and in accordance with the present disclosure.

In various embodiments, the error estimator module 102 receives as input the streamed vehicle data 30*a*-30*n*. The error estimator module 102 performs error analysis of the predictions based on a worst-case scenario to produce error model data 114. In various embodiments, the analysis and thus, the error model data 114 can be provided based on various vehicle types and driving habits. This analysis happens offline and occasionally, for example, when a prediction model is changed. In various embodiments, the error model data 114 for various vehicle types and driving habits between other edge nodes 14*b*-14*n*.

The asynchronous prediction module 104 receives as input the streamed vehicle data 112. The asynchronous prediction module 104 projects the latitude and longitude of the vehicle data 112 into inertia space. The asynchronous prediction module 104 then computes an estimation of a vehicle pose 116 and a prediction of vehicle pose 118 recursively based on a past computed state, a current computed state, and the current measurements from the vehicle data 30. In various embodiments, the computed state includes, for example, a position X, a position Y, a heading, a speed, a yaw rate, and an acceleration.

In various embodiments, the asynchronous prediction module 104 computes the vehicle pose estimation 116 and the vehicle pose prediction 118 using data from a previous time stamp and a current time stamp (as shown in FIG. 3), and using a prediction model 120 such as a Constant Turn Rate and Acceleration (CTRA) model that may be reduced or modified and retrieved from the prediction model datastore 110. In various embodiments, the prediction models 120 can be retrieved for a type of the road the vehicle data 112 is associated with, for example, a straight road CTRA model can be used and a curved road mixed model including a CTRA model and Constant Turn Rate Velocity (CTRV) model can be used.

When the vehicle data 112 is not up-to-date or lost entirely, the asynchronous prediction module 104 computes the vehicle pose prediction 118 using a last vehicle pose estimation 116. In another example, when there is missing or incomplete data from the vehicle data 112 stream (e.g., the data is not trustworthy), the asynchronous prediction module 104 computes the vehicle pose prediction 118 using the error profile model 115 from the error model datastore 108 associated with the vehicle type and driving habit associated with the vehicle data 112.

The synchronous prediction module 106 receives the vehicle pose prediction 118 and the vehicle pose estimation 116 from the asynchronous prediction module 104. The synchronous prediction module 106 performs batch prediction 122 of the vehicle pose for the vehicles according to a global synchronous time frame. In various embodiments, the synchronous prediction module 106 uses the same prediction models 120 used by the asynchronous prediction module 104 and stored in the prediction model datastore 110. When the measurements from a specific vehicle 12a-12n are not received, the synchronous prediction module 106 computes the vehicle pose prediction 122 using the error profile model 115 from the error model datastore 108 associated with the vehicle type and driving habit associated with the vehicle data 112.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for predicting a vehicle pose, comprising:
a non-transitory computer readable medium comprising:
an asynchronous prediction module configured to, by a processor, receive vehicle data from a vehicle, and compute a prediction of vehicle pose from the vehicle data, wherein the computation is performed asynchronously using a vehicle time frame and a common coordinate system;
a synchronous prediction module configured to, by the processor, compute a final prediction of the vehicle pose across a plurality of vehicles based on the prediction of vehicle pose from the asynchronous prediction module, wherein the computation is performed synchronously using a global time frame and the common coordinate system; and
a control module configured to, by the processor, perform remote control of the vehicle or another vehicle based on the final prediction.

2. The system of claim 1, wherein the asynchronous prediction module computes the prediction of the vehicle pose based on a last estimation of vehicle pose, a current prediction of vehicle pose, and the vehicle data.

3. The system of claim 1, wherein the asynchronous prediction module computes the prediction of the vehicle pose based on a prediction model associated with at least one of a curved road and a straight road.

4. The system of claim 3, wherein the prediction model is based on a Constant Turn Rate and Acceleration (CTRA) model.

5. The system of claim 3, wherein the prediction model is based on a Constant Turn Rate and Acceleration (CTRA) model and a Constant Turn Rate and Velocity (CTRV) model.

6. The system of claim 1, wherein the asynchronous prediction module computes the prediction of the vehicle pose based on an error profile model.

7. The system of claim 6, wherein the error profile model is associated with a vehicle type and a driving habit associated with the vehicle data.

8. The system of claim 1, wherein the synchronous prediction module computes the final prediction of the vehicle pose based on a prediction model associated with at least one of a curved road and a straight road.

9. The system of claim 8, wherein the prediction model is based on a Constant Turn Rate and Acceleration (CTRA) model.

10. The system of claim 8, wherein the prediction model is based on a Constant Turn Rate and Acceleration (CTRA) model and a Constant Turn Rate and Velocity (CTRV) model.

11. The system of claim 1, wherein the synchronous prediction module computes the final prediction of the vehicle pose based on an error profile model.

12. The system of claim 11, wherein the error profile model is associated with a vehicle type and a driving habit associated with the vehicle data.

13. A method for predicting a vehicle pose, comprising:
receiving, by a processor, vehicle data from a vehicle;
computing, by the processor, a first prediction of vehicle pose from the vehicle data, wherein the computation is performed asynchronously using a vehicle time frame and a common coordinate system;
computing, by the processor, a final prediction of the vehicle pose based on the first prediction of vehicle pose, wherein the computation is performed synchronously using a global time frame and the common coordinate system; and
performing, by the processor, remote control of the vehicle or another vehicle based on the final prediction.

14. The method of claim 13, wherein the computing of the prediction of the vehicle pose is based on a last estimation of vehicle pose, a current prediction of vehicle pose, and the vehicle data.

15. The method of claim 13, wherein the computing of the prediction of the vehicle pose is based on a prediction model associated with at least one of a curved road and a straight road.

16. The method of claim 15, wherein the prediction model is based on a at least one of a Constant Turn Rate and Acceleration (CTRA) model and a Constant Turn Rate and Velocity (CTRV) model.

17. The method of claim 13, wherein the computing of the prediction of the vehicle pose is based on an error profile model.

18. The method of claim 17, wherein the error profile model is associated with a vehicle type and a driving habit associated with the vehicle data.

19. The method of claim 13, wherein the computing of the final prediction of the vehicle pose is based on a prediction model associated with at least one of a curved road and a straight road.

20. The method of claim 19, wherein the prediction model is based on at least one of a Constant Turn Rate and Acceleration (CTRA) model and a Constant Turn Rate and Velocity (CTRV) model.

\* \* \* \* \*